(No Model.)
A. ALLGOEVER.
DRILL STOCK.
No. 383,031. Patented May 15, 1888.
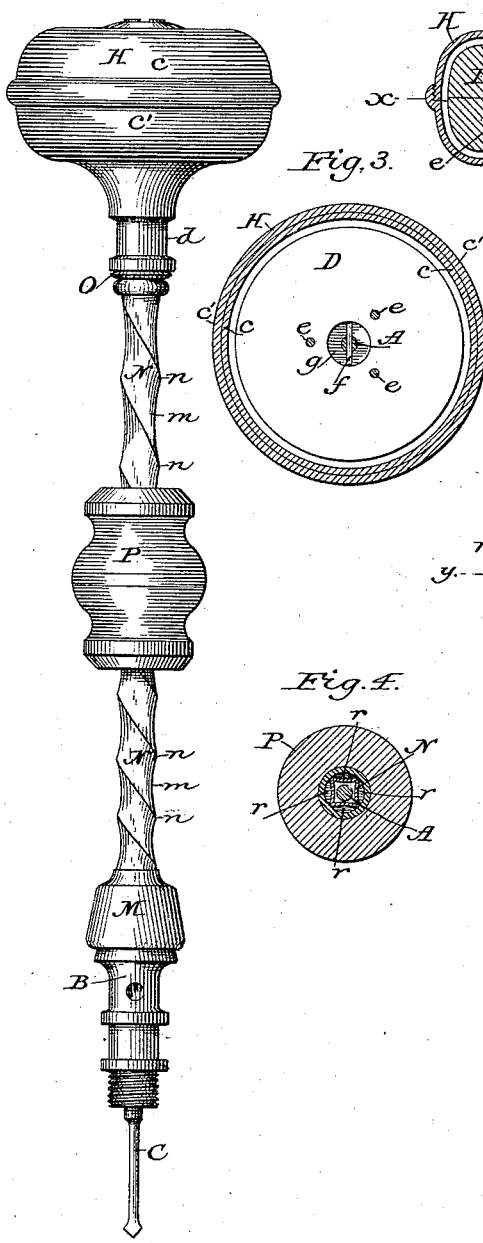
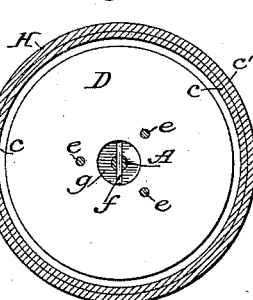
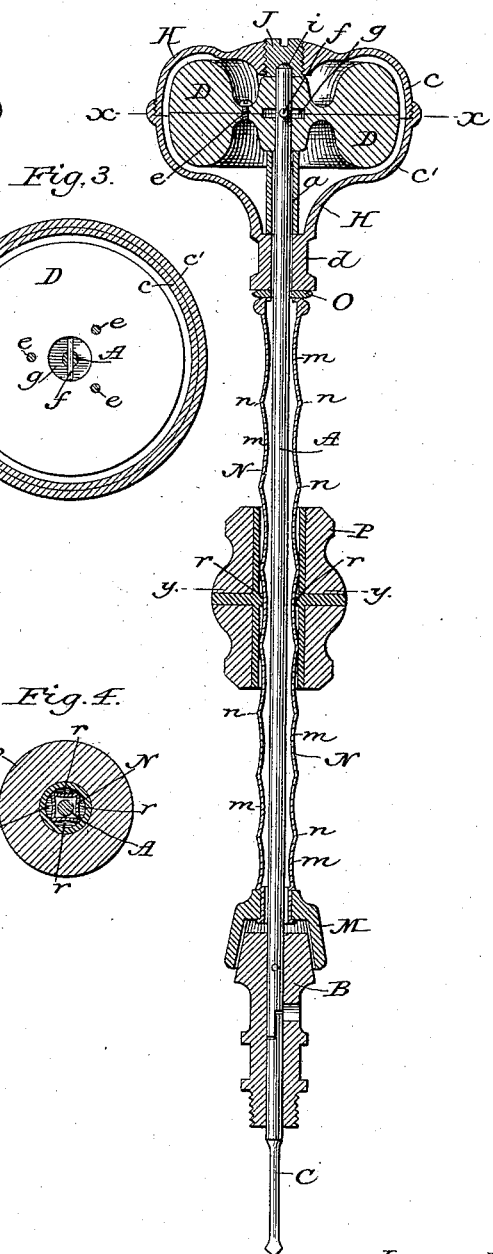
Attest:
A. N. Jesbera
A. D. Vinton
Inventor:
Augustus Allgoever.
By David A. Burr.
Atty.

UNITED STATES PATENT OFFICE.

AUGUSTUS ALLGOEVER, OF NEW YORK, N. Y.

DRILL-STOCK.

SPECIFICATION forming part of Letters Patent No. 383,031, dated May 15, 1888.

Application filed October 21, 1887. Serial No. 252,975. (No model.)

*To all whom it may concern:*

Be it known that I, AUGUSTUS ALLGOEVER, of the city, county, and State of New York, have invented certain new and useful Improvements in Stocks for Hand-Drills, Hand-Lathes, Polishing-Tools, and other Tools; and I do hereby declare that the following is a full and exact description thereof, reference being had to the accompanying drawings, and to the letters of reference marked thereon, making a part of this specification, in which—

Figure 1 is an elevation of my improved stock for hand-drills and other tools; Fig. 2, a central longitudinal section of the same, the nut being shown as on the upward stroke. Fig. 3 is a transverse section in line $x\ x$, and Fig. 4 a transverse section in line $y\ y$ of Fig. 2.

My invention relates to that class of stocks for drills and other tools in which the drill or tool is operated by the reciprocating movement of the nut upon a spirally-threaded rotating spindle carrying the same.

It has for its object to simplify the construction of such a stock and to render its operation more effective.

It consists in the combination, with the spindle of a hand-drill or other revolving hand-tool provided at one end with a suitable socket for receiving the tool, of a fly-wheel mounted upon the opposite end of the spindle and coupled thereto by a frictional connection, a sleeve having spiral grooves or threads formed externally along the length thereof, and which is fitted upon the spindle to have a slight longitudinal play thereon, and to engage the socket-piece of the spindle by means of a cone-clutch, and a loose nut moving upon the sleeve, whereby when the nut is held fast to prevent its rotation and is pushed forward toward the socket it will produce an engagement of the sleeve with the socket by means of the interposed cone-clutch, and operating to turn the sleeve will thereby turn the socket, tool-spindle, and tool; but when the nut is lifted or pushed in the opposite direction it will disengage the clutch, leaving the spindle and tool to continue their rotation independently of the sleeve, while the nut is carried back to the opposite end in readiness to be again pushed forward.

In the accompanying drawings, A represents a drill-spindle, and B a socket secured to its lower end to receive and hold a drill, C, in any approved manner.

D, Fig. 2, is a fly-wheel divided circumferentially into two halves adapted to be united by transverse screws $e$, and which is centrally perforated to receive the upper end of the spindle A, to which it is secured by means of a transverse pin, $f$, (or of a disk or plate as its equivalent,) fixed in or upon the spindle to enter and fit closely within a circular recess, $g$, formed in the opposite faces of the two divisions of the fly-wheel to encircle the central aperture therein. The pin $f$, or equivalent disk, is of a diameter slightly greater than the full depth of its inclosing circular recess $g$, so that when the divisions are clamped together by the screws $e$ they may be made thereby to clamp more or less tightly said pin $f$, and the pressure upon the pin be so adjusted as that under normal conditions the frictional contact of the pin with the wheel will cause the wheel and spindle to revolve together, while in the event of any unusual strain or check upon either the one may rotate independently of the other by means of the revolution of the pin in its inclosing recess.

The fly-wheel D, thus fitted upon the upper end of the drill-spindle A, is inclosed within a suitable shell or handle, H, also formed in two circumferential divisions, $c\ c'$. The lower division, $c'$, terminates in a collar, $d$, to embrace the spindle, and a loose sleeve, $a$, is interposed upon the spindle between the collar $d$ and the fly-wheel, its upper end serving as a bearing for the fly-wheel. The upper division, $c$, of the shell or handle H is made to screw into a seat in the rim of the lower division, $c'$, and is fitted centrally with a screw-plug, J, which screws into a central aperture in the top of the shell. This screw-plug is formed with a central recess, $i$, to receive the upper end of the spindle A and form a pivoted bearing therefor.

The upper end of the drill-socket B is made conical or tapering in form, and a counterpart conical cap, M, is fitted loosely upon the other end of the sleeve to fit upon said socket and engage the same with a frictional bearing, the opposed tapering surfaces constituting a clutch. A long tube or sleeve, N, is likewise fitted over the drill-spindle A and attached to the cap M, to extend thence to the collar d of the handle H. A washer, O, is interposed between the upper end of the sleeve N and the collar d, and a slight longitudinal play is permitted to the sleeve, whereby the opposed conical surfaces of the socket B and cap M, fixed to the sleeve, may be brought into close frictional contact and engagement, so that a revolution of the sleeve shall produce a rotation of the spindle, or may be separated to allow the latter to turn independently of the former. (See Fig. 2.) The sleeve N is formed or fitted with external spiral grooves, m m, and intervening threads, n n, along its length, and a nut, P, is fitted to slide freely longitudinally upon the sleeve, this nut being formed with an internal cylindrical aperture to embrace the threads of the sleeve, and with internal offsets, r r, midway its length, to fit into the grooves of the spiral, whereby the movement of the nut longitudinally upon the sleeve in either direction will produce, if the nut be prevented from turning, a revolution of the sleeve about its longitudinal axis.

The pitch of the spiral grooves m m is made to increase gradually toward the lower end of the sleeve, as shown in Fig. 1, so that as the nut P is carried from the top to the bottom of the sleeve at a uniform speed the speed of rotation will be made to gradually increase during the entire movement.

In the operation of the device, if the nut P be pushed toward the upper end of the sleeve, it will operate to lift the sleeve N so as to disengage the cap M from the socket B, and the sleeve will revolve upon the spindle A independently thereof. If, now, the nut P be held in the hand so that it may not turn, and be forced toward the socket B, the engagement of the internal offsets, r r, with the spiral grooves m m of the sleeve will first force the cap M of the sleeve into engagement with the socket-head B of the spindle, and will then cause the sleeve and spindle to rotate with an increasing speed as the nut approaches the cap M. By lifting the nut as it approaches the cap the sleeve N will be disengaged from the socket B, leaving the socket and spindle free to continue their rotation while the nut is carried to its first position. The momentum of the fly-wheel D, carried within the shell or handle H upon the upper end of the spindle, will operate effectually to continue the rotary movement of the spindle as the nut is being elevated. In case the spindle is accidentally caught and held it is protected from too great a strain thereon by reason of the momentum of the fly-wheel by the pin f, or equivalent disk, confined in the circular recess g between the two divisions of the fly-wheel, which allows an independent movement of the wheel in case of such a strain.

I claim as my invention—

1. The combination of the spindle, the shell or handle fitted upon one end thereof and furnishing a pivotal bearing for said end, a socket-piece secured upon the opposite end of the spindle, an interposed spirally-grooved sleeve encircling the spindle loosely and having a limited longitudinal play thereon between the socket-piece and handle, a nut fitted upon the sleeve to engage its spiral grooves, and a clutch formed between the proximate ends of the sleeve and socket-piece, substantially in the manner and for the purpose herein set forth.

2. The combination of the spindle, the divided fly-wheel, a pin fixed radially in the spindle to project therefrom into a circular recess between the divisions of the fly-wheel, and screws whereby the divisions are clamped upon the pin, substantially in the manner and for the purpose herein set forth.

3. The combination of the drill-spindle, the fly-wheel attached to the end thereof, and a shell or handle inclosing the fly-wheel and furnishing an end bearing for the spindle, substantially in the manner and for the purpose herein set forth.

In testimony whereof I have signed my name to this specification in the presence of two subscribing witnesses.

AUGUSTUS ALLGOEVER.

Witnesses:
A. N. JESBERA,
E. M. WATSON.